3,230,226
DERIVATIVES OF 6-HYDROXYNICOTINE
Edward Bernasek, Winston-Salem, N.C., assignor to R. J. Reynolds Tobacco Company, Winston-Salem, N.C., a corporation of New Jersey
No Drawing. Filed Jan. 8, 1964, Ser. No. 336,359
5 Claims. (Cl. 260—291)

This invention relates to derivatives of 6-hydroxynicotine and more particularly relates to compounds having the general formulae:

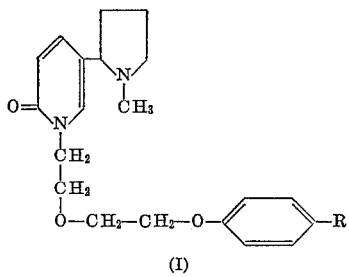

(I)

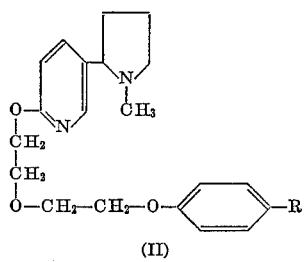

(II)

wherein R is a straight or branched chain alkyl group having from 4 to 10 carbon atoms. The compounds having the general Formula I may be designated as 1-[p-(alkyl)phenoxyethoxyethyl] - 5 - (N - methyl - 2 - pyrrolidinyl)-2-pyridones and compounds having the general Formula II may be designated as the isomeric 2 - [p - (alkyl)phenoxyethoxyethoxy] - 5 - (N - methyl-2-pyrrolidinyl)-pyridines.

The above indicated compounds alone or in admixture with each other are useful as wetting agents and they have been found to possess a high degree of antimicrobial activity. Thus they are particularly useful in the preparation of effective detergent compositions having germicidal properties and they may be used alone or in combination with other detergents and germicides in the preparation of soaps, powdered detergents and the like for use in cleaning compositions for kitchens, restaurants, hospitals, dairies or other areas. They are particularly suitable for use in compositions which are employed for cleaning under acid conditions.

The compounds of this invention are prepared by several methods. The first involves the conversion of the known compound 6-hydroxynicotine to its sodium or potassium salt with sodium or potassium hydroxide. The resulting salt is then reacted with the appropriate 1-(2-haloethoxy) - 2 - (p - alkylphenoxy) - ethane. The reaction product is primarily a compound having the Formula I above but oftentimes it has admixed with it a minor amount of compounds having Formula II. The mixture of compounds formed as reaction products may be used as detergents or the two compounds may be separated and used for the purposes indicated if desired. By a second procedure the compounds having Formula II may be prepared by a known process which involves the reaction of 6-chloronicotine with the sodium or potassium salt of the appropriate 2-[2-(p-alkylphenoxy)-ethoxy]-ethanol.

In the following example is described a single procedure for preparing compounds having Formula I and Formula II wherein the R group is 1,1,3,3-tetramethyl butyl. In a 500-ml., 2 necked, round bottomed flask equipped with a mechanical stirrer were placed 35.6 g. (0.20 mole) of 6-hydroxynicotine and 300 ml. of 1,2-dimethoxyethane. Ten milliliters of a concentrated sodium hydroxide solution (10 g. of sodium hydroxide in 10 ml. of water) were added dropwise during 0.5 hr. with vigorous stirring. After completing the addition of the sodium hydroxide solution, the mixture was heated to reflux and 31.2 g. (0.10 mole) of 1-(2-chloroethoxy)-2-(p-1,1,3,3-tetramethylbutylphenoxy)-ethane were added dropwise during 1.0 hr.

After refluxing for 24 hours, the excess 1,2-dimethoxyethane was removed by distillation at atmospheric pressure. The residual oil was poured into 250 ml. of ice-cold water and extracted with three 100-ml. portions of ether. The ether extracts were combined, dried over anhydrous sodium sulfate and the ether removed under reduced pressure.

The residual oil was dissolved in 50 ml. of hexane and placed on an alumina column. The column was eluted with 10 liters of hexane followed by 1.2 liters of a mixture of hexane:ether (99:1) to remove the unreacted 1 - (2 - chloroethoxy) - 2 - (p - 1,1,3,3 - tetramethylbutylphenoxy)-ethane. The desired reaction product mixture was eluted with 10 liters of a mixture of hexane:methanol (99.5:0.5). The product was a colorless viscous oil which partially solidified on standing in the refrigerator overnight. The semi-solid was dissolved in pentane and the solution cooled in an ice bath. The colorless crystals which separated were filtered off, washed with cold pentane and air-dried. The yield of purified 1 - [p - (1,1,3,3 - tetramethylbutyl)phenoxyethoxyethyl]-5 - (N - methyl - 2 - pyrrolidinyl) - 2 - pyridone was 10.9 g., M.P. 68–69° C.; $[\alpha]_D^{26} = -38°$ (in $CHCl_3$).

The pentane filtrate was concentrated under reduced pressure to yield a red, viscous oil. The oil was allowed to stand for several days at room temperature and a colorless solid separated from the oil. Five milliliters of 30–60° petroleum ether were added and the suspension cooled in an ice bath. The colorless solid was filtered off, washed with cold 30–60° petroleum ether and air-dried. Recrystallization from 30–60° petroleum ether gave 0.8 g. of 2-[p-(1,1,3,3-tetramethylbutyl)-phenoxyethoxyethoxy] - 5 - (N - methyl - 2 - pyrrolidinyl)-pyridine, M.P. 78–78.5° C., $[\alpha]_D^{26} = -43.6°$ (in $CHCl_3$).

The two compounds prepared in accordance with the foregoing example were shown to be excellent wetting agents in acid solution, and also when tested exhibited good antibacterial and antifungal properties.

It will be appreciated that the homologues of the compounds disclosed in the foregoing example may be readily prepared utilizing known 1-(2-chloroethoxy)-2-(p-alkylphenoxy)-ethanes other than the one specified above. Thus it will be appreciated that the alkyl group may be straight or branched chain butyl, pentyl, hexyl, decyl, etc. and preferably contains between 4 and 10 carbon atoms.

While particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

What is claimed is:

1. A compound selected from the group of 1-[p-(alkyl)phenoxyethoxyethyl] - 5 - (N - methyl - 2 - pyrrolidinyl)-2-pyridone and 2-[p-(alkyl)phenoxyethoxyethoxy]-5-(N-methyl-2-pyrrolidinyl)-pyridine wherein the alkyl group contains from 4 to 10 carbon atoms.

2. 1 - [p - (1,1,3,3 - tetramethylbutyl)phenoxyethoxyethyl]-5-(N-methyl-2-pyrrolidinyl)-2-pyridone.

3. 2 - [p - (1,1,3,3-tetramethylbutyl)phenoxyethoxyethoxy]-5-(N-methyl-2-pyrrolidinyl)-pyridine.

4. 1 - [p - (octyl)phenoxyethoxyethyl] - 5 - (N - methyl-2-pyrrolidinyl)-2-pyridone.

5. 2 - [p - (octyl)phenoxyethoxyethoxy] - 5 - (N-methyl-2-pyrrolidinyl)-pyridine.

References Cited by the Examiner

UNITED STATES PATENTS

| 2,315,314 | 3/1943 | Burger | 260—291 |
| 2,433,267 | 12/1947 | Feinstone | 260—297 |

OTHER REFERENCES

Klingsberg: "Pyridine and Derivatives," Part 3, Interscience Pub. Inc., 1962, pages 632–633.

Noller: "Chemistry of Organic Compounds," 2nd ed., 1957, W. B. Saunders Co., pp. 137 and 504.

WALTER A. MODANCE, *Primary Examiner.*

NICHOLAS S. RIZZO, *Examiner.*